(12) United States Patent
Xue et al.

(10) Patent No.: US 8,344,646 B2
(45) Date of Patent: Jan. 1, 2013

(54) MULTIPLE VOLTAGE BALLAST

(75) Inventors: Huijie Xue, Beijing (CN); Ning Zhai, Beijing (CN)

(73) Assignee: Fulham Company Limited, Wanchai (HK)

( * ) Notice: Subject to any disclaimer, the term of this patent is extended or adjusted under 35 U.S.C. 154(b) by 1409 days.

(21) Appl. No.: 11/369,892

(22) Filed: Mar. 6, 2006

(65) Prior Publication Data

US 2007/0217093 A1    Sep. 20, 2007

(51) Int. Cl.
 *H05B 37/02*    (2006.01)
(52) U.S. Cl. ............. 315/291; 315/200 R; 315/209 R; 315/224; 315/307
(58) Field of Classification Search ............ 315/209 R, 315/224, 291, 307, 200 R
 See application file for complete search history.

(56) References Cited

U.S. PATENT DOCUMENTS

| | | | |
|---|---|---|---|
| 4,184,128 A | 1/1980 | Nilssn | |
| 4,780,805 A * | 10/1988 | Chewuk et al. | 363/142 |
| 4,845,607 A * | 7/1989 | Nakao et al. | 363/49 |
| 4,933,832 A * | 6/1990 | Schneider et al. | 363/143 |
| 4,937,731 A * | 6/1990 | Konopka | 363/143 |
| 4,963,795 A | 10/1990 | Nilssn | |
| 5,047,690 A | 9/1991 | Nilssn | |
| 5,162,984 A * | 11/1992 | Castagnet et al. | 363/61 |
| 5,214,355 A | 5/1993 | Nilssn | |
| 5,309,066 A | 5/1994 | Ditlevsen | |
| 5,446,346 A | 8/1995 | Nilssn | |
| 5,446,347 A | 8/1995 | Nilssn | |
| 5,475,284 A * | 12/1995 | Lester et al. | 315/209 R |
| 5,510,681 A | 4/1996 | Ni | |
| 5,671,131 A * | 9/1997 | Brown | 363/49 |
| 5,969,481 A * | 10/1999 | Konopka | 315/209 R |
| 6,008,589 A | 12/1999 | Deng et al. | |
| 6,031,338 A | 2/2000 | Yoon et al. | |
| 6,049,177 A | 4/2000 | Felper | |
| 6,111,365 A | 8/2000 | Mirskiy et al. | |
| 6,222,322 B1 | 4/2001 | Stack | |
| 6,437,520 B1 | 8/2002 | Grouev et al. | |
| 6,452,343 B2 * | 9/2002 | Oostvogels et al. | 315/209 R |
| 6,459,213 B1 | 10/2002 | Nilssn | |
| 2002/0017877 A1 * | 2/2002 | Oostvogels et al. | 315/291 |
| 2005/0253744 A1 * | 11/2005 | Kern | 341/110 |

OTHER PUBLICATIONS

STMicroelectronics, AN993 Application Note, Electronic Ballast with PFC Using L6574 and L6561, 2004, pp. 1-20.
Yang, Bo; Topology investigation of front end DC/DC converter for distributed power system; Dissertation; 2003, Chapter 4, pp. 94-141.

\* cited by examiner

*Primary Examiner* — Jimmy Vu
(74) *Attorney, Agent, or Firm* — Henricks, Slavin & Holmes LLP (57) ABSTRACT

A ballast and method for operating a ballast includes a switch or other circuit for connecting and disconnecting a voltage multiplier to a rectifier circuit. A control circuit for controlling the switch senses an input voltage and connects the voltage multiplier to the rectifier circuit when an input voltage falls below a selected voltage level.

17 Claims, 5 Drawing Sheets

MULTIPLE VOLTAGE BALLAST

BACKGROUND

1. Field

These inventions relate to apparatus, for example ballasts, and methods for operating ballasts, and apparatus and methods for operating fluorescent and similar light sources, for example, ballasts, inverters, drivers, or oscillators for operating such light sources.

2. Related Art

Electronic ballasts are widely used to power lighting circuits, including conventional fluorescent lamps, compact fluorescent lamps, and other fluorescent lighting components. Some electronic ballasts have power factor correction while others do not. In some ballasts, passive power factor correction can be accomplished using a large inductor in series with the power line input. Active power factor correction can be applied in other ballasts using a boost circuit. In other ballasts having no power factor correction, the ballasts are generally considered to have normal power factor. Examples of ballasts are shown in U.S. Pat. No. 6,008,589, incorporated herein by reference.

In electronic ballasts having normal power factor, such ballasts are not generally capable of operating over a wide range of voltages. However, ballasts having active power factor correction generally have low total harmonic distortion but are more expensive than normal power factor ballasts, which have higher total harmonic distortion. Active power factor correction ballasts, because of their lower total harmonic distortion can be easily used in both consumer and industrial power applications where input voltages can range widely from 120 volts to 277 volts. Such ballasts can have wide applicability with low total harmonic distortion. However, normal power factor ballasts are not easily used over a number of different voltages without high total harmonic distortion.

Ballasts used in large installations having a large number of light units preferably have good power factor correction. Without good power factor correction, excessive harmonic distortion in the line current can lead to overheating of the neutral conductor in a facility using three phase power. In areas where power utilities monitor or meter the power factor of customers, especially big consumers, the utilities may charge rates that may increase when the power factor is low. In other situations, normal power factor ballasts may be desirable, such as those where there is a relatively small number of lighting units or where the input voltage levels are well-known or relatively reliable. For example, vending machine lights, UV sterilization lights, and advertising displays use a relatively small number of lighting units It is still desirable for these ballasts to be able to operate at two voltages, even though they do not need high quality power factor correction. Additionally, portable or mobile facilities such as command posts, field hospitals, aid stations and the like operate on portable generators, many capable of operating at either 120 volts or 240 volts. For lighting systems intended to operate only at 120 volts, inadvertent application of 240 volts through an incorrect setting at the generator may quickly destroy the lighting units and possibly other equipment used in the facilities. Therefore, such lighting units would quickly fail if they could not operate at both 120 volts and 240 volts or 277 volts, an industrial voltage level.

In some commercial applications, it is not always confirmed whether the facility operates at high voltage such as 240 or 277 volts or off 120 volts. If the lighting unit operates at only one voltage level, the lighting unit is quickly destroyed or may be ineffective if the supply voltage is a different level.

SUMMARY

A ballast and a driving circuit for a light source and a method for driving a load such as a light source are described. The apparatus and method may be used as a normal power factor circuit, for example a circuit without active power factor correction or no power factor correction. The circuit and method may use a switch to connect and disconnect a multiplier to a rectifier circuit, and operation of the switch may be a function of an input voltage level.

In one example, an apparatus and method of controlling a ballast circuit includes a normal power factor ballast having an AC voltage input for driving a load. A sensing circuit senses the level of the AC voltage and the the level is used to change a configuration of the ballast between the input circuit and the load as a function of the AC voltage level. In another configuration, a voltage multiplier is coupled to the AC voltage input and the sensing circuit controls a coupler to couple and decouple the voltage multiplier from at least a portion of the AC voltage input.

In another example of a ballast and method of operating a ballast, a rectifier circuit and a multiplier circuit may be coupled between an input and an output and a switch circuit or on/off circuit may alternately activate and deactivate the rectifier circuit and the multiplier circuit, respectively, based on input from a control circuit. In one example, the control circuit may operate as a function of a voltage at an input to the rectifier circuit or other input. In another example, the control circuit may be a voltage sensing circuit at an input to the rectifier circuit. In a further example, the control circuit may connect the rectifier circuit and a multiplier component when an input voltage is low activating the multiplier circuit. In another example, the control circuit may connect the multiplier component to the rectifier circuit while at the same time deactivating part of the rectifier circuit, for example several diodes in the rectifier circuit. In another example, the multiplier circuit is a voltage doubler circuit.

In another example of a ballast and method of operating a ballast, a rectifier circuit and a multiplier component may be coupled between an input and an output and a switch circuit or on off circuit may connect and disconnect the multiplier component from the rectifier circuit based on input from a control circuit. In one example, the control circuit may operate as a function of a voltage at an input to the rectifier circuit or other input. In another example, the control circuit may be a voltage sensing circuit at an input to the rectifier circuit. In a further example, the control circuit may connect the rectifier circuit and the multiplier component when an input voltage is low. In another example, the control circuit may connect the multiplier component to the rectifier circuit while at the same time deactivating part of the rectifier circuit. In another example, the multiplier component forms a voltage doubler circuit.

In a further example of a ballast and method of operating a ballast, a switch or on off circuit controls whether a multiplier component and rectifier circuit are electrically coupled together, where the multiplier component and rectifier circuit are between an input and a driver circuit. The multiplier component and the rectifier circuit are connected together when an input voltage is below a predetermined level, and they are disconnected when the input voltage is above a predetermined level. In one example, both levels are the same and are approximately 180 volts. Other voltage levels can be selected.

In an additional example of a ballast and method of operating a ballast, a switch is used to connect and disconnect a rectifier circuit and a multiplier component as a function of an input voltage to the rectifier circuit using a control circuit between the input and the switch. The control circuit may include a coupling circuit, which may include an optical coupler, a magnetic coupler, a capacitive coupler or other controllable coupling circuits. An example of an optical coupler includes an optical TRIAC, and an example of a magnetic coupler includes a relay. The control circuit may include a signal inverter so that the switch closes when an input voltage decreases below a predetermined level. The control circuit may also include a delay circuit, in one example so that the multiplier component is not connected to the rectifier circuit on start-up, for example when the input voltage is high.

In another example of a ballast and method of operating a ballast, a rectifier circuit and multiplier component are coupled between an input and a load driver circuit with a TRIAC that can connect and disconnect a rectifier circuit and the multiplier component. The TRIAC can be controlled by a voltage sensing or trigger circuit, and the voltage sensing or trigger circuit can include an optical coupler for controlling the TRIAC. In one example, the optical coupler is an optical TRIAC.

In a further example of a ballast circuit and method of operating a ballast circuit, a full wave bridge circuit and a voltage multiplier component are connected and disconnected by a connection circuit whereby the full wave bridge circuit is changed when the voltage multiplier component is coupled to the bridge circuit. A control circuit is coupled to the connection circuit for changing the configuration or state of the connection circuit as a function of an input voltage. The connection circuit may be a switch assembly, and may include a TRIAC, and may also include a portion of a coupler. In another example, the control circuit may include a portion of a coupler operable as a function of an input voltage sensed by the control circuit. The coupler may be an optical coupler, magnetic coupler, capacitive coupler or other controllable coupler. In one example, the coupler is an optical TRIAC. The control circuit may be a voltage sensing circuit, such as may sense a voltage at an input to the full wave bridge circuit, and may include one or more of a capacitor, delay circuit, inverter circuit and gate circuit.

In another example of a ballast circuit and method of operating a ballast circuit, an AC voltage is applied to an input circuit and the AC voltage is rectified to a DC signal. A switch configuration is changed when the AC voltage passes a first voltage level so that the DC signal is applied to a multiplier circuit. In one example, the AC voltage is rectified by a full wave rectifier in one configuration of the switch and in another configuration of the switch the AC voltage is multiplied. In another example, the switch configuration is changed when the AC voltage is below 180 volts. Another example changes the switch configuration using an optical input signal, such as one controlled by a voltage sensing circuit.

These and other examples are set forth more fully below in conjunction with drawings, a brief description of which follows.

DETAILED DESCRIPTION

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of circuits and of methods of using the circuits are described. Depending on what feature or features are incorporated in a given structure or a given method, benefits can be achieved in the structure or the method. For example, circuits using a voltage controlled switch or other circuit control may provide more flexibility in operation without needing more expensive components. They may also allow operation at several different voltages, such as two different voltages, or other conditions without the need for manual adjustments. The circuit can adjust the operation automatically at the input of the drive circuit for the load, such as by switching between two configurations depending on the input voltage. Circuits using a voltage controlled switch may also allow driving a load without the need, for example, of any significant active power factor correction or no power factor correction. Additionally, such a configuration may also allow proper operation, such as for lighting or other systems where the power supply is accidentally set in the wrong configuration. Additionally, the configurations described in the present examples are relatively simple and low cost, while still providing for operation at different voltages at normal power factor. Alternative to switches and a voltage sensor combination, a voltage detector may also be operated to control another form of activator besides a switch.

These and other benefits will become more apparent with consideration of the description of the examples herein. However, it should be understood that not all of the benefits or features discussed with respect to a particular example must be incorporated into a circuit, component or method in order to achieve one or more benefits contemplated by these examples. Additionally, it should be understood that features of the examples can be incorporated into a circuit, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of circuit configurations and of methods of making and using the circuits are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Triac devices are used in examples for a circuit that can incorporate one or more of the features and derive some of the benefits described herein, and in particular ballast circuits. However, other configurations may also be used. Additionally, ballasts may be used in locations where two sets of voltages are possible, for example 120 volts and 240 volts. However, while ballasts will be described that are suitable for these two voltages, it should be understood that the ballast designs could operate for other voltage combinations as well.

Figure 1:
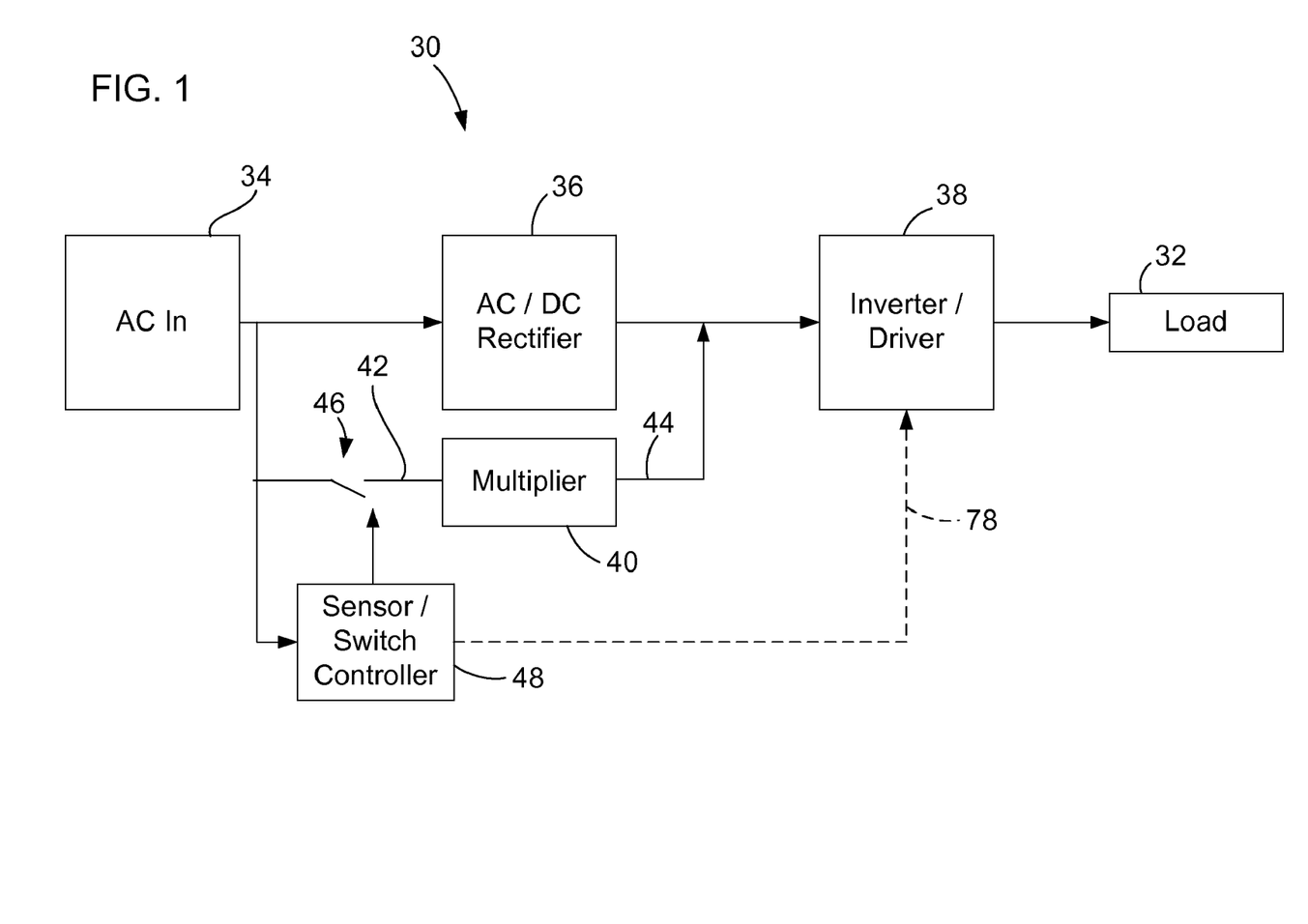
FIG. 1 is a schematic and block diagram of a ballast and a driving circuit for a light source and a method for driving a load such as a light source.

In one example of methods and apparatus described herein, a ballast circuit 30 or other circuit for driving a load 32 may include an alternating current or other input 34 (FIG. 1). In the present examples described herein, it will be assumed that the AC input 34 receives alternating current input from normal power mains, supplying 120 volts, 240 volts or 277 volts at 50 or 60 Hz, and the component values described herein assume the possibility of those inputs. However, if the AC input levels are significantly different from these, circuit component values can be adjusted in the design so that the ballast can easily accommodate two or three different voltages other than these. However, the description herein and component values provided in the example assumes that the AC input conforms to the commonly available inputs, namely 120 volts, 240 volts or 277 volts at which most power systems are designed. Additionally, the AC input 34 may receive the voltage input from a portable, emergency or other power supply, including those that may be configured to selectively output either of two different voltages. Therefore, the present examples will be considered in the context of any of the foregoing examples, while it should be understood that other examples are possible.

A rectifier such as an AC/DC rectifier circuit 36 is coupled to the AC input and receives the incoming alternating current signal from the AC input. The rectifier can take a number of configurations, but the example described herein is a full wave bridge rectifier. The output of the rectifier is applied to a conventional inverter or driver 38, the output of which is then applied to the load 32. The load 32 in the present examples will be taken to be a conventional fluorescent lamp, for example a fluorescent tube lamp, compact fluorescent lamp or other light source, but it should be understood that other loads can be driven by inverter/driver 38. For example, an inverter can be a series resonant inverter, parallel resonant inverter, self resonating half bridges, driven inverters, and the like. Additionally, with a driven inverter, the output from the voltage sensor can be used to control the frequency of the inverter and make fine adjustments to the lamp current, for example at higher voltages for a circuit optimized for lower voltages, or at lower voltages for a circuit optimized for higher voltages.

The ballast circuit 30 also includes a multiplier circuit 40, for example a voltage doubler, having an input 42 coupled between the AC input 34 and the rectifier 36 and an output 44 coupled to an input of the inverter/driver 38. In the present examples, the multiplier 40 is coupled in the circuit across the rectifier 36. The multiplier circuit 40 is controllable as desired to double the voltage at the input of the inverter/driver 38, and is configured to be similar to a conventional voltage doubler used in ballasts. However, it should be understood that the multiplier 40 can be configured to multiply the voltage input to the inverter/driver 38 by the desired factor or multiplication value.

The multiplier 40 includes at its input 42 and between the input 42 and the AC input 34 a switch 46. The switch 46 can be used to selectively connect and disconnect the multiplier 40 from the AC input or other portion of the circuit including a voltage from the AC input 34. The switch can be a conventional switch or other circuit change device that can be used selectively to add and remove a voltage multiplication function as seen by the inverter/driver 38. In the present examples, the switch 46 may be a high power TRIAC, or it could be a number of other circuit assemblies, including two SCRs configured back-to-back, two MOSFETs back-to-back, or other suitable circuit assemblies for selectively connecting and disconnecting the multiplier 40. In the examples provided herein, the switch 46 is coupled to the rectifier circuit in such a way that when the multiplier is coupled to the rectifier circuit, the rectifier circuit is converted to a voltage doubler circuit.

The ballast circuit 30 includes a sensor and switch controller 48 configured to control the switch 46. The controller 48 is also configured to sense or otherwise determine an input characteristic such as the level of the input voltage from the AC input 34, and use the information to control switch 46. The information can also be used to control or influence other circuit components or functions, as described more fully herein. In the present examples, the controller 48 is coupled between the voltage input and the switch 46 for sensing the input voltage being applied to the rectifier circuit 36. The controller 48 then controls the configuration of the switch 46 as a function of the voltage determined at the AC input 34. The controller 48 may include means for coupling the controller to the switch 46, for example an optical coupler, magnetic coupler, capacitive coupler, transistor coupler or the like. The controller 48 may also include a delay circuit for delaying operation of the controller until such time as the ballast reaches steady state.

Figure 2:
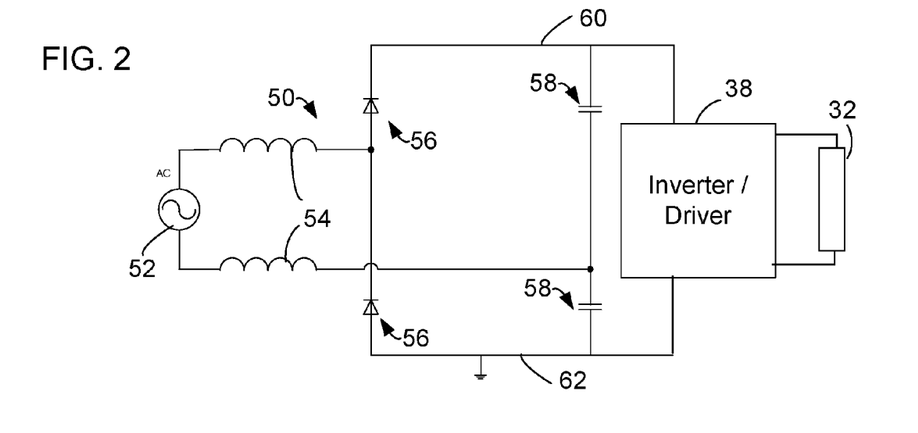
FIG. 2 is a schematic of a voltage doubling circuit.

FIG. 2 shows schematically a conventional voltage doubler circuit 50 in its simplest form coupled to an AC power source 52 through a pair of inductors 54 wound in opposite directions relative to each other in the conventional manner. One inductor is coupled between a pair of diodes 56 forming a half bridge rectifier, while the other inductor is coupled between a pair of capacitors 58 forming the voltage multiplier at the input to the inverter 38. One side of the pair of diode 56 and one side of the pair of capacitors 58 is coupled to a first line 60 and the other sides are coupled to the second line 62 of the ballast circuit, and to which the inverter or driver circuit is coupled for driving the load 32.

Figure 3:
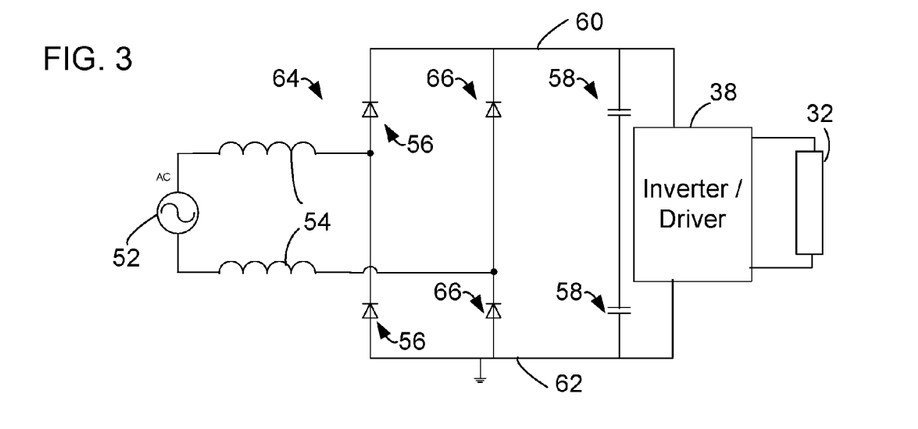
FIG. 3 is a schematic of a full wave bridge circuit.

FIG. 3 shows schematically a conventional full wave bridge rectifier circuit 64 without voltage doubling wherein the second inductor is coupled between a second pair of diodes 66 so the first and second pairs of diodes 56 and 66 form the full wave bridge rectifier. The first and second pairs of diodes 56 and 66 are coupled to the first and second lines 60 and 62, as shown in the drawing, in parallel with the pair of capacitors 58. The inverter/driver 38 receives the rectified varying DC signal from the lines 60 and 62.

Figure 4:
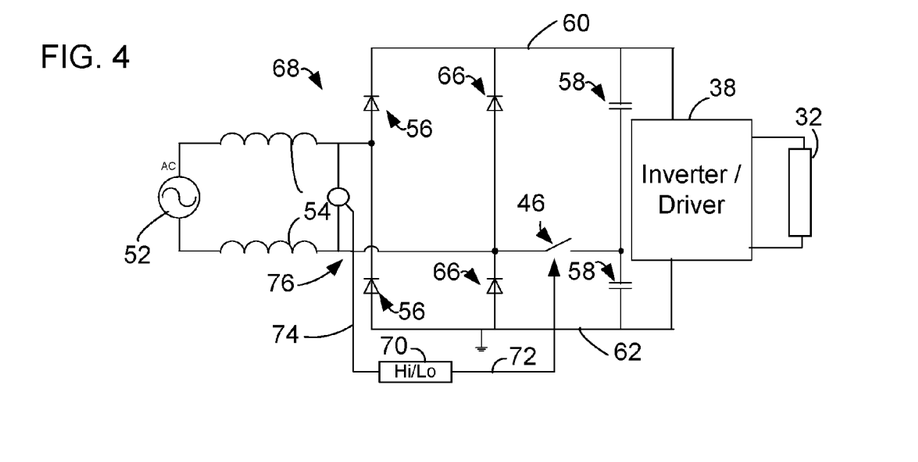
FIG. 4 is a schematic of a circuit having a control and a circuit changing element in the form of a switch operated by the control.

FIG. 4 shows a schematic of that portion of the circuit of FIG. 1 that produces the input to the inverter/driver circuit 38. In this example, the second inductor 54 is coupled between the second pair of diodes 66, the line between which is also coupled to the switch 46. The other side of the switch 46 is coupled between the capacitor pair 58. As is represented in FIG. 4, when the switch 46 is open, the current from the second inductor 54 is applied to the second pair of diodes 66. When the switch 46 is closed, the current from the second inductor 54 is applied instead to the capacitor 58 to serve as a voltage doubler, effectively removing the second pair of diodes 66 and leaving a half wave bridge rectifier formed by the first pair of diodes 56. Therefore, the configuration of the switch can be used to change the circuit in front of the inverter/driver 38 from a full wave bridge rectifier to a voltage doubler configuration. Specifically, when the voltage supplied by the AC power source 52 is high, the switch 46 is open, effectively removing the voltage doubler capacitor pair 58 from the circuit. When the voltage supplied by the AC power source 52 is low, the switch 46 is closed in order to double the voltage applied to the inverter/driver circuit 38, and convert the rectifier circuit to a half wave bridge rectifier.

In FIG. 4, the sensor/switch controller 48 is represented by a high low voltage sensor and switch controller 70 having an output 72 configured to control switch 46. The voltage sensor and switch controller 70 has an input 74 coupled to the AC input at 76 for allowing the voltage sensor and switch controller 70 to sense the voltage applied to the rectifier circuit.

In one example of a method of controlling a ballast circuit, considering the general configuration represented by FIG. 1 and a specific configuration represented by FIG. 4, an AC voltage is applied from an AC power source 52 to an AC voltage input represented in FIG. 4 by the inductor's 54. In the examples considered herein, the applied AC voltage is either 120 volts or 240 volts. In one configuration, represented by FIG. 4, the incoming AC signal is rectified by the full wave bridge rectifier circuit represented by diode pairs 56 and 66 when the switch 46 is open. This configuration is represented in one example by a high voltage, in the present case 240 volts, being sensed at the input at 76 by the sensor and controller 70, which keeps or allows the switch 46 to stay open. The inverter/driver 38 sees at its input approximately the same voltage as what is being applied at the AC input. In one configuration, the controller 70 may apply a signal which affirmatively keeps the switch 46 open, and in another configuration, where the switch 46 is normally open, the controller may simply eliminate application of any significant signal to the switch 46, thereby leaving the switch open.

In another configuration where the voltage level sensed at the input represented at 76 decreases or is below a selected threshold, such as 180 volts, the incoming voltage is assumed to be approximately 120 volts (in the present example), the controller 70 senses the lower voltage level and closes switch 46, or allows the switch to close, thereby invoking the voltage doubler circuit through capacitors 58 and effectively removing the second pair of diodes 66 from the full wage bridge rectifier circuit, converting it to a half wave bridge rectifier. The inverter/driver 38 sees a doubled voltage above the input voltage sensed at 76, maintaining the desired driving characteristics for the load 32.

Instead of controlling the switch 46, or in addition thereto, the controller 48 may control one or more elements in the inverter/driver 38 as a function of the voltage sensed at the AC input 34. As represented in FIG. 1, the controller 48 may be coupled to one or more circuits in the inverter/driver 38 over line 78. For example, the switch controller 48 may be used to change or adjust the current applied to the load 32. In one configuration, the switch controller 48 may increase or decrease an inductance, or increase or decrease a capacitance as a function of the voltage sensed at the AC input. Changing the inductance or the capacitance in the inverter/driver circuit 38 can be used to change the current applied to the load 32. Other functions can be controlled by the controller 48, as well, based on the sensed voltage at the AC input.

Figure 5A:
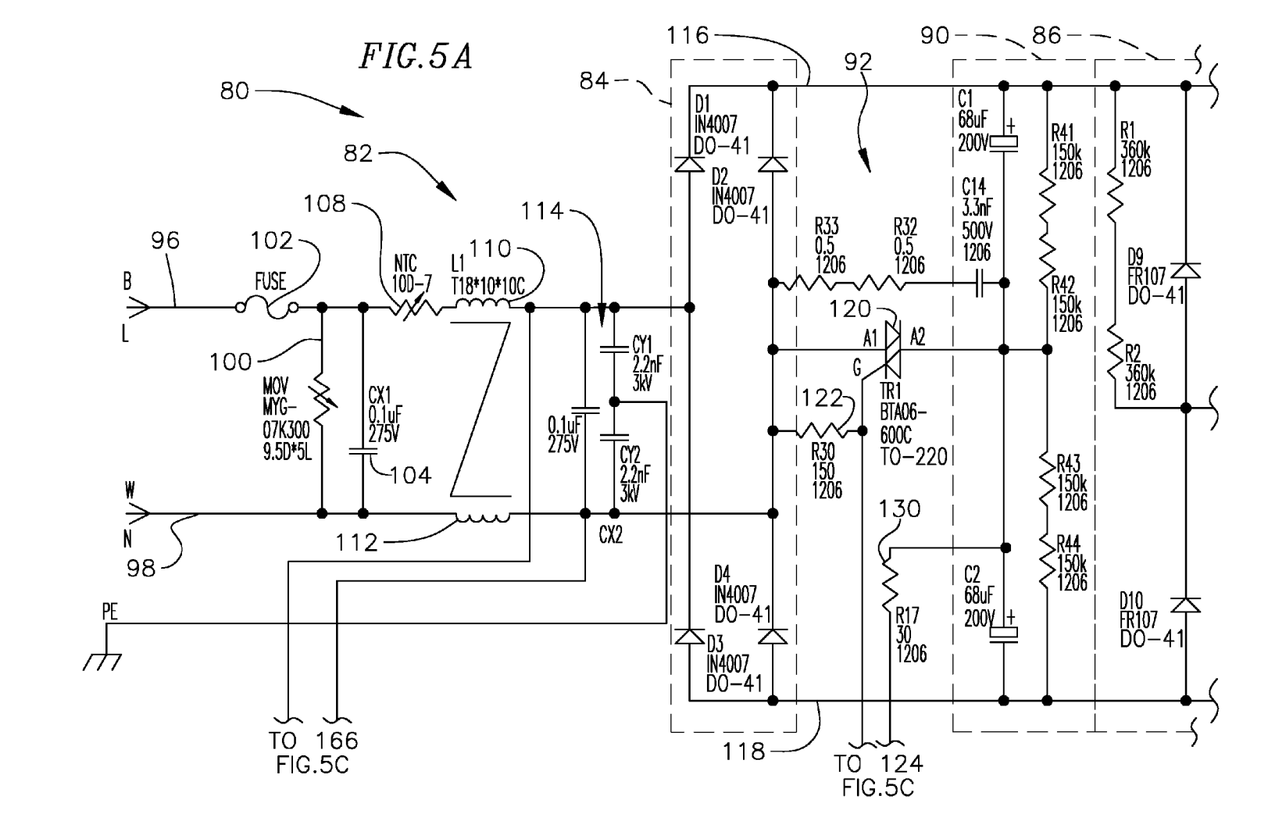
FIGS. 5A-5C are a detailed circuit diagram in accordance with one example of the present inventions.
Figure 5B:
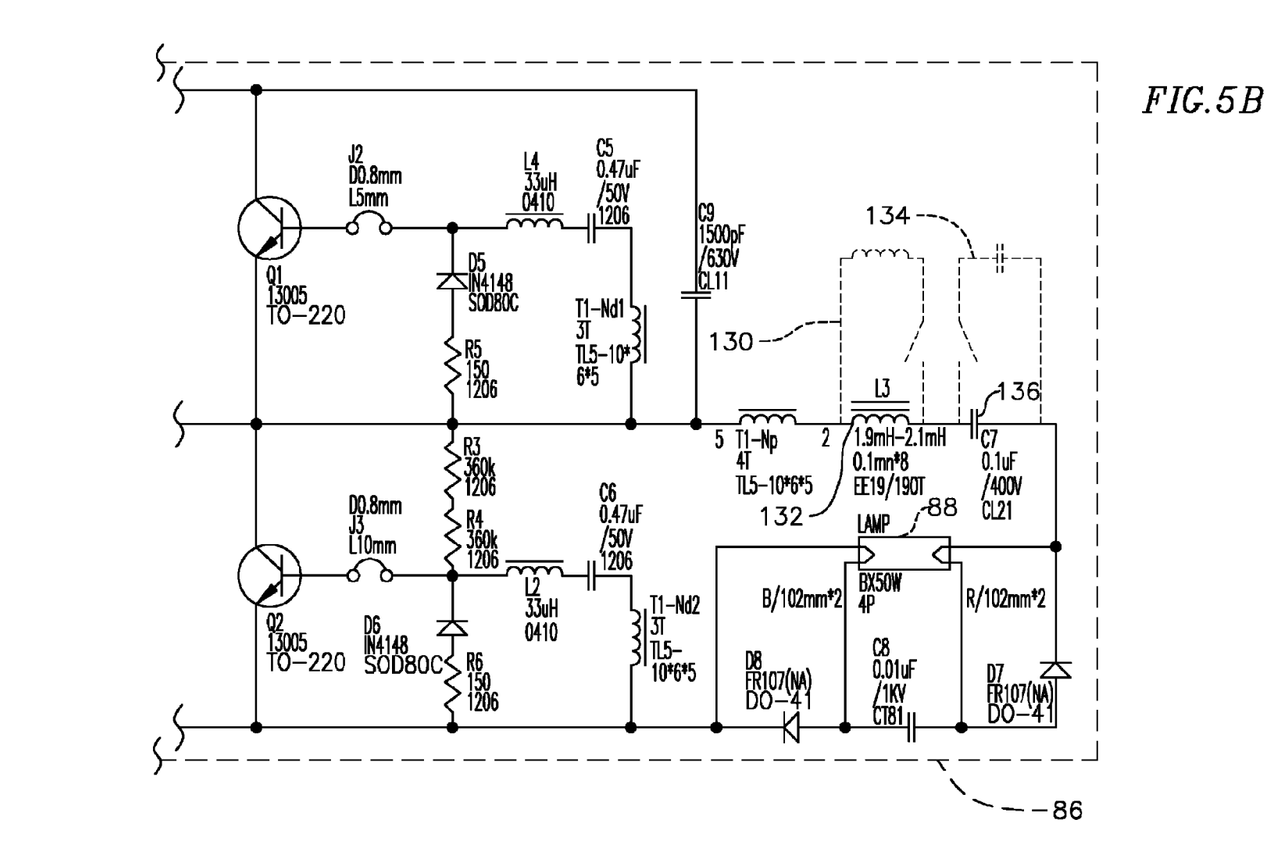
Figure 5C:
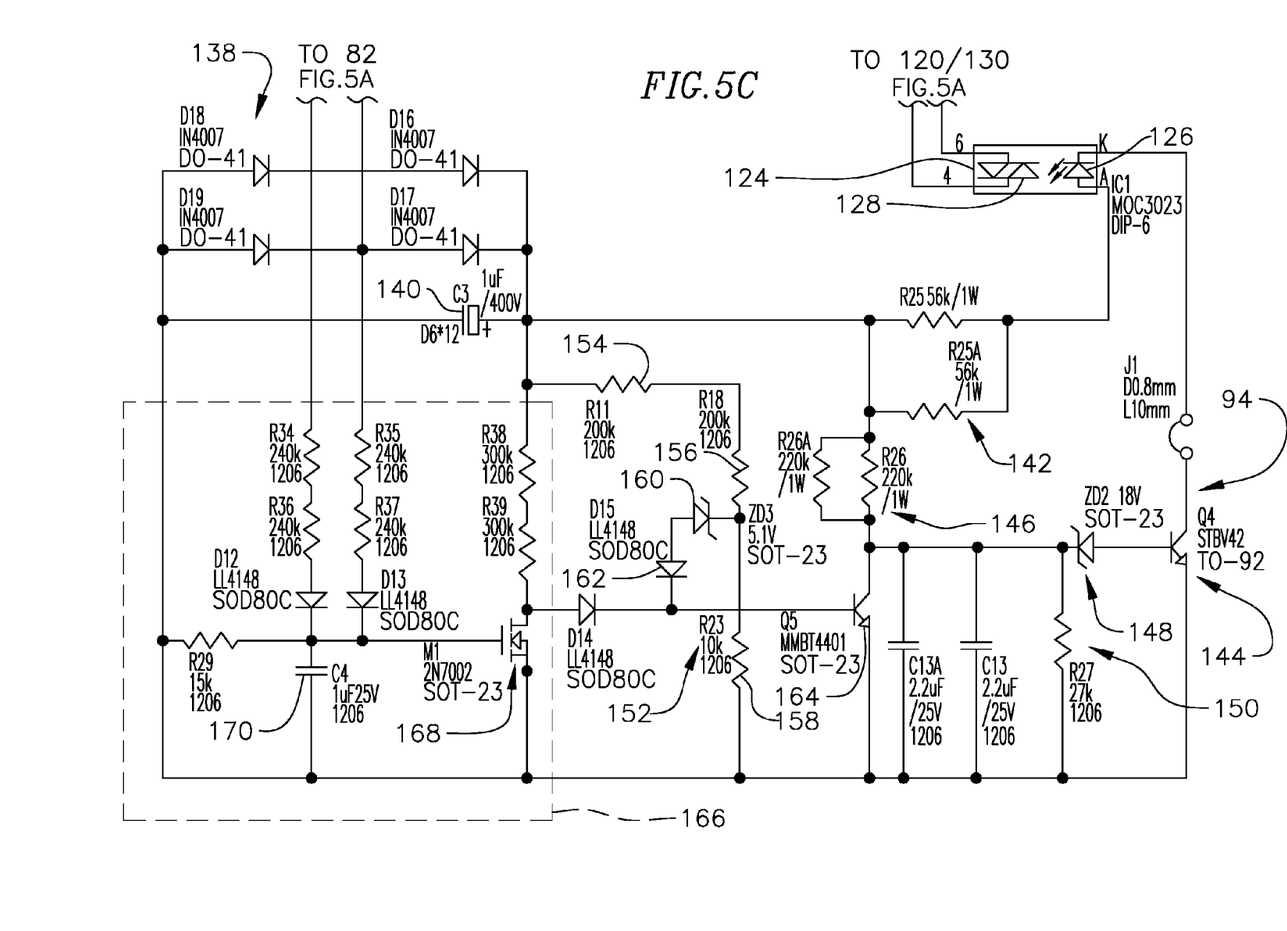

Considering another example of apparatus and methods for operating a ballast, for example to drive a light source, a ballast circuit 80 includes an input circuit 82, a rectifier circuit 84 and an inverter or driver circuit 86 for driving a load 88 (FIG. 5). The inverter circuit 84 is coupled to the input circuit 82, and the inverter circuit 86 receives the inverted output for driving the load. A switch circuit 92 is for activating and deactivating or coupling and decoupling a multiplier circuit. A sensing and control circuit 94 is coupled to the input circuit 82 and to the switch circuit 92. The sensing and control circuit 94 in the present example senses the input voltage and uses a characteristic of the input voltage, for example the magnitude of the voltage, to control the switch configuration in the switch circuit 92. The configuration and operation of these circuits and assemblies are discussed more fully below.

Considering first the input circuit, the ballast includes a hot conductor 96 and a neutral 98 with a variable resistor 100. A fuse 102 on the hot conductor protects the ballast circuit from excessive voltage spikes. A capacitor 104 also spans the hot and neutral in parallel with the variable resistor 100. A thermistor 106 is placed in series with the hot input before the inductor 110, paired with the inductor 112 on the neutral.

The inputs to the sensing and control circuit 94 are taken off the output sides of the inductor pair 110 and 112. In a parallel capacitor network 114 is placed across the hot and neutral lines, between the taps for the sensing and control circuit 94 and the rectifier circuit 84.

The rectifier circuit 84 is a conventional full wave rectifier bridge, having diodes D1-D4 arranged in the conventional manner. The hot input is coupled between diodes D1 and D3, and the neutral is coupled between the diodes D2 and D4. The full wave rectifier bridge produces a rectified current signal on the upper line 116 and the lower line 118.

The multiplier circuit includes multiplier components in the form of series capacitors C1 and C2 90 in parallel with the rectifier circuit 84. The capacitors 90 and the rectifier circuit 84 are configured as would be conventional for ballast circuits and provide a high frequency current signal to the inverter 86. The inverter 86 is a conventional driving circuit for the lamp 88 and is not discussed further except as noted below with respect to adjustments in the current in the inverter circuit.

The switch circuit 92 is coupled between the rectifier circuit 84 and the capacitors 90. The switch circuit couples and de-couples the capacitors and the rectifier circuit, and serves to activate and de-activate the multiplier circuit. One side of the switch circuit is coupled to the rectifier circuit 84 between diodes D2 and D4, and the second side of the switch circuit is coupled between the capacitors C1 and C2. In the present example, the switch circuit includes a high power high current Triac 120 coupled between the rectifier circuit 84 and the capacitors 90. A snubber circuit is coupled in parallel with a Triac 120 between the rectifier circuit 84 and the capacitors 90, and includes series connected resistors R32 and R33 and capacitor C14. Capacitor C14 is shown in FIG. 5 as a 3.3 nF capacitor but it could also be a pair of parallel 22 nF capacitors in series with the resistors R32 and R33, as noted in the Table I, and the resistors R32 and R33 could be 18 ohm resistors. Because the Triac is sensitive to the rate of change of a voltage, the snubber circuit damp's the voltages applied across the Triac, so that abrupt voltage changes across the Triac will not trigger the Triac to change state. A resistor R30 122 couples the gate of the Triac to the rectifier circuit 84 between diodes D2 and D4, so that the gate of the Triac is normally off and is shorted to the lower line 118 until a charge is pulled on the gate of the Triac to turn it on.

The sensing and control circuit 94 switches the Triac 120 on and off, in the present example, under the control of the circuit 94 based on the voltage level sensed at the input 82. While the sensing and control circuit 94 can take a number of configurations, the circuit includes a coupling circuit for coupling the sensing and control circuit to the switch circuit. In the present example, the coupling circuit is an optical Triac 124. The optical Triac can be considered to have an optical portion or other activation portion part of the sensing and control circuit and a switch or other portion forming part of the switch assembly 92. However, the optical Triac 124 will be considered together as they are generally packaged as a unit, though they need not be. The optical Triac 124 includes an LED or other light source 126 electrically coupled in the sensing and control circuit 94 and an optically sensitive Triac 128. The optically sensitive Triac 128 is coupled at its input through a resistor R17 130 to the multiplier component between the capacitors C1 and C2 and at its output to the gate of the main Triac 120.

The coupling circuit can also be a magnetic coupler, a capacitive coupler, a transistor-transistor coupler, or the like.

The coupling circuit 124, or a comparable circuit, may also be used to couple and de-couple one or more circuits in the inverter circuit 86, for example to adjust the current in the inverter circuit applied to the load. In one example, the coupling circuit may include a branch (not shown) to an inductor circuit 130 coupled in parallel to the inductor L3 132. Alternatively, or in addition, the coupling circuit 124 or a comparable circuit can control a capacitor circuit 134 in parallel with the capacitor 136. Either or both of the circuits 130 or 134 can be used to change the current flowing in the inverter circuit 86 to load 88 as a function of the voltage level or other characteristic at the input 82.

Considering the sensing and control circuit 94 in more detail, the alternating current signal is taken from the input 82 and applied to a conventional full wave bridge rectifier circuit 138 comprised of diodes D16-D19. The output of the rectifier circuit is applied to a capacitor 140 in parallel with the rectifier circuit 138. The anode of the capacitor 140 is coupled through parallel resistors 142, comprising high power resistors R25 and R25A to the anode of the LED 126 in the optical Triac 124. The current through the LED is provided by the charge stored on the capacitor 140. The cathode of the LED 126 is coupled through a switching transistor 144 to the cathode of the capacitor 140 and the other side of the rectifier circuit 138.

The base of the transistor 144 is controlled by a parallel resistor circuit 146 coupled to the anode of the capacitor 140 and a zener diode 148. The parallel resistors 146 are comprised of high power resistors R26 and R26A coupled between the anode of the capacitor 140 and the cathode of the Zener diode 148. The anode of the Zener diode is coupled to the base of the transistor 144. A parallel network 150 of capacitors C13 and C13A and resistor R27 are coupled between the cathode of the Zener diode 148 and the other side of the rectifier circuit 138.

The sensing and control circuit 94 also includes an inverter stage in assembly 152 to keep the transistor 144 off and the main Triac 120 disconnected when the input voltage is sufficiently high, for example above 180 volts. The inverter stage includes a voltage divider network including series resistors 154 and 156 and resistor 158 with the cathode of a Zener diode 160 between resistors 156 and 158. The inverter stage also includes in the present example diode 162 between the anode of the Zener diode 160 and the base of transistor 164.

In the present example, the sensing and control circuit 94 includes a delay circuit 166 coupled between the AC signal input 82 and the other side of the rectifier 138. The delay circuit 166 includes a first series of resistors R34 and R36 and diode D12 and a second series of resistors R35 and R37 and diode D13. The first and second series are coupled to the base of a NMOS transistor 168 and to a capacitor 170, the other side of which is coupled to the back side of the rectifier 138. The base of the transistor 168 is also coupled to the back side of the rectifier bridge 138 through resistor R29. The transistor 168 gets current from the capacitor 140 through resistors R38 and R39. The delay circuit 166 takes current from the base of transistor 168 until a capacitor 170 charges, at which time the rest of the sensing and control circuit 94 will be able to properly sense the input voltage and either leave the main Triac 120 open or close the main Triac.

A method of operating a ballast, for example for driving a load such as a fluorescent ballast, in the context of the example of FIG. 5 can generally be described as a voltage controlled switching between a first condition with a full wave rectifier input to an inverter and a second condition with a multiplied half wave rectified input to the inverter. Except for startup conditions described below, the optical TRIAC will always be on when the line or mains input voltage is below a certain level. Specifically, capacitor C3 140 after initial startup is charged sufficiently to provide a power rail at the positive end of capacitor C3, being fed by the auxiliary bridge circuit 138, and provides current to the optical LED provided transistor Q4 144 is turned on. Therefore, the sensor and control circuit 94 can be considered a voltage controlled trigger circuit in the form of a voltage activated switch. The LED side of the trigger circuit can be considered part of the trigger circuit, and the TRIAC side can be considered part of the switch. It should be noted that an optical coupler is used, and other couplers can be used also, to accommodate the significant signal differences between the high voltage signal from the voltage doubler and the voltage signal from the trigger circuit (relative to any common rail).

When the line or main input is low, for example at 120 volts, the input to the inverter will be in a doubler configuration. Therefore, when the main TRIAC 120 is closed, the input to the inverter 86 is in a doubler configuration. However, when the line voltage is high, the main Triac 120 will be open, and the line input voltage will not be doubled because transistor Q4 will be turned off, and the main TRIAC 120 will be off.

Considering the sensing and control circuit 94 in more detail, the full wave bridge rectifier circuit 138 including D16-19 and capacitor C3 140 senses the input voltage at the input circuit 82. The voltage across the capacitor C3 is about 170 Vdc at 120 Vac input at the input 82. Between the cathode of diode D17 and the anode of diode D19, there is a pulsating full wave rectified 120 cycles per second signal. Capacitor C3 140 smoothes the signal and provides a reliable DC power supply coupled to between the anode and the cathode of capacitor C3 140. The delay circuit combination 166 described below includes transistor M1 168 and diodes D12 and D13 and resistors R34-37, which keep the main TRIAC 120 off during initial startup for a predetermined period, so that the voltage doubler is not accidentally turned on at startup with an input main or line voltage at 240 or 277. However, after the initial delay, and when the voltage across R23 158 in the voltage divider network is not high enough to breakdown the Zener diode ZD3 160, the transistor Q5 164 stays off and transistor Q4 144 stays on and conducts current for lighting the LED 126. It is noted that the resistor R23 is shown in FIG. 5 as a 10 k ohm resistor, but it could also be a 22 k ohm resistor as noted in Table I below. The current is supplied from the capacitor 140 through the resistors 142 to the LED as long as the transistor Q4 144 is on. Specifically, the rectified voltage across capacitor C3 140 charges capacitors C13 and C13A through parallel resistors 146 (R26 and R26A) to 18V, and breaks down Zener diode ZD2 148 to turn Q4 on. Therefore, the light-emitting diode in the optical triac 124 turns on, thereby turning on the optical control triac 128. When the optical control triac 128 is turned on, the gate of the main triac 120 can get triggering current every half cycle to turn on the main Triac 120.

The capacitors C13 and C13A help to suppress noise and spikes to reduce the possibility of such signals affecting the trigger circuit, and thereby affecting the main TRIAC 120. Resistor R27 alternatively may be placed on the other side of Zener diode ZD2 148 for reducing leakage.

With the main Triac 120 on, the rectifier bridge comprised of diodes D1 and D3, the Triac 120, and the multiplier components C1 and C2 compose a voltage doubler rectifier circuit. Capacitor C1 in the voltage doubler is charged to peak of the upper line voltage through diode D1 and Triac 120 at positive half cycle, and capacitor C2 is charged to the same value through the Triac and the diode D3 at the negative half cycle. Therefore, the bus voltage is 2 times the peak of the incoming line voltage, i.e. 2 times 170 Vdc, or 340 Vdc.

When the line or main input is high, for example at 240 volts or 277 volts, the input to the inverter will be a rectified high voltage, and the capacitors of the multiplier will be removed from the circuit and the rectifier will be in its full wave bridge configuration. Specifically, when the voltage on the anode of capacitor C3 140 is high enough, at all times the voltage sends a current through resistors R11, R18 and R23. Resistors R11 and R18 provide a voltage divider with R23, and when the voltage between resistors R18 and R23 is high enough, the Zener diode ZD3 160 breaks down and sends current to the base of transistor Q5 164, in the present example through a diode D15, turning on transistor Q5 164. When transistor Q5 is turned on, a substantial current is drawn through the large high power parallel resistors R26 and R26A (one watt), and transistor Q4 144 is turned off. The collector of transistor Q5 164 is a low impedance source and either it pulls up the low impedance through resistors pair R26 and R26A or the transistor is turned on and the current pulled down through the resistors pair. In either situation, there is very firm, decisive control over the node at the collector of the transistor Q5 164. The node at the collector connects through the Zener diode ZD2 148 to the base of transistor Q4 144. The Zener diode ZD3 determines the voltage threshold along with the ratio of the voltage divider resistors R11 and R18 to R23 at which the trigger circuit switches the optical coupler on and off. Zener diode ZD3 160 is shown in FIG. 5 as a 5.1 volt Zener, but it could also be an 8.2 volt Zener diode as noted in Table I below. Zener diode ZD2 148 helps to reduce the possibility of noise, leakage or other unwanted signals triggering the circuit. As a result, the threshold for triggering transistor Q4 144 is firm and decisive.

Therefore, when the voltage at the input is high enough, Zener diode ZD3 160 breaks down and turns on transistor Q5, which turns off transistor Q4. Specifically, in the present example, the voltage across capacitor C3 140 is 340 Vdc at 240 Vac input. The Zener diode ZD3 160 breaks down by the higher voltage divided by resistors R23, R18 and R11. Therefore, transistor Q5 164 is turned on and Zener diode ZD2 148, transistor Q4 144, and the optical Triac are turned off accordingly. With the optical Triac off, the main Triac cannot get any gate triggering pulse and also stays off. The full wave bridge rectifier circuit D1, D2, D3, D4, C1 and C2 with the main Triac off compose a simple full wave bridge rectifier circuit, and the bus voltage is about the peak of the AC line voltage, i.e. 340 Vdc. Consequently, when the voltage is high enough, the optical TRIAC 124 turns off and disconnects the main TRIAC 120, so that the input voltage of the inverter comes directly from the line or main input through the full wave rectifier. In the present example, the trigger circuit 94 turns on the main TRIAC on low input voltage, rather than high input voltage, and circuit 152 with the transistor Q5 164 provides the desired inverting function in the trigger circuit.

In the present example, the delay circuit 166 reduces the possibility that a high input line voltage is doubled and delivered to the inverter 86. Therefore, unless the ballast has been connected for 20-30 milliseconds, such as on the initial startup, it is assumed that the incoming voltage is high or 240 volts, and it is undesirable to have the main TRIAC on at startup. The delay circuit drives the trigger circuit off during initial startup until the trigger circuit can measure the actual incoming voltage level. Specifically, the large capacitor C4 is coupled to the gate of NMOS transistor M1 168, as is resistor R29, which discharges the capacitor C4 170. When the circuit is first energized, the capacitor C4 is discharged and takes 20 or 30 milliseconds to charge up. During that time, the transistor M1 168 will be off and the incoming current to the trigger circuit will pass through resistors R38 and R39 to the forward biased diode D14 to the base of transistor Q5, turning it on. While transistor Q5 is on, the transistor Q4 is off, the optical TRIAC is off and the main TRIAC 120 is also off, insuring that the voltage doubler is not used. 30 As current flows through resistors R34 and R36 and diode D12, or resistors R35 and R37 and diode 13, capacitor C4 charges up and turns on transistor M1 168. After transistor M1 is turned on, diode D14 becomes reverse biased, and the sensing and control or trigger circuit 94 operates as a function of whether the actual measured input voltage is high or low, as though the delay circuit 166 was not present.

With the circuit shown in FIG. 5, the bus voltage is kept constant at different line voltages. The inverter stage operates at constant input DC voltage for keeping the output power and lamp current constant despite different AC input voltages.

As an additional feature, when the voltage changes, the trigger circuit may instead or in addition make another change, adjustment or initiate another process. For example, the trigger circuit can be used to change the frequency of the inverter. Then, the inverter can operate at a different frequency. For example, in going from 120 volts to 277 volts, the current in the inverter may be higher than desired. The current can be reduced, for example, by changing the inductance of the inductor L3 or changing the capacitance of the capacitor C7. For example, another inductor circuit 130 can be placed in parallel with the inductor L3 with a switch, or a parallel capacitor circuit 134 can be placed across the capacitor C7 with a switch. Adding inductance or adding capacitance would reduce the current at the higher voltages. Conversely, a switch can be used to remove inductance or capacitance at lower voltages. An additional optical coupler or other couplers can be used in the trigger circuit to control additional switches. Alternatively, a single LED can be used to activate several optical TRIACs in a single package.

Exemplary values for the circuit components are represented in Table I.

TABLE I

| Component | Abbreviation | Description |
|---|---|---|
| E-Cap | C1, C2 | C ELE 68 uF 200 V M 105☐ EB |
| E-Cap | C3 | C ELE 1 uF 400 V M 105☐ 2000H CD110 |
| SMD Cap | C5, C6 | C SMD 0.47 uF 50 V K X7R |
| SMD Cap | C4 | C SMD 1 uF 25 V K |
| SMD Cap | C13, C13A | C SMD 2.2 uF 25 V K |
| SMD Cap | C14, C14A | C SMD 22 nF 500 V K X7R |
| Film Cap | CX1, CX2 | C MEF 0.1 uF 275AC K MKP62 |
| Film Cap | C7 | C MEF 0.1 uF 400 V J CL21 |
| Film Cap | C9 | C MEF 1500 PF 630 V J CL11 |
| Ceramic Cap | C8 | C DIS 0.01 uF 1 KV M CT81 |
| Ceramic Cap | CY1, CY2 | C DIS 2200 PF 3 KV M CT81 |
| SMD Resistor | R1~R4 | R SMD 360K ¼ W J |
| SMD Resistor | R5, R6, R30 | R SMD 150 ¼ W J |
| SMD Resistor | R11, R18 | R SMD 220K ¼ W J |
| SMD Resistor | R17 | R SMD 30 ¼ W J |
| SMD Resistor | R23 | R SMD 22K ¼ W J |

TABLE I-continued

| Component | Abbreviation | Description |
|---|---|---|
| SMD Resistor | R27 | R SMD 27K ¼ W J |
| SMD Resistor | R29 | R SMD 15K ¼ W J |
| SMD Resistor | R32, R33 | R SMD 18 ¼ W J |
| SMD Resistor | R34~R37 | R SMD 240K ¼ W J |
| SMD Resistor | R38, R39 | R SMD 300K ¼ W J |
| SMD Resistor | R41~R44 | R SMD 150K ¼ W J |
| Resistor | R25, R25A | R MF 56K 1 W J RJ16 |
| Resistor | R26, R26A | R MF 220K 1 W J RJ16 |
| Varistor | MOV | R VR MYG3-07K300 |
| Resistor | NTC | R NTC NTC10D-7K |
| Jumper | J1, J3 | R JUMPER 10 mm*8 mm φ ≦ 0.8 mm |
| Jumper | J2 | R Jumper 5 mm*8 mm Φ ≦ 0.8 mm |
| Diode | D1~D4, D16~D19 | D DIO 1000 V 1 A 1N4007 DO-41 |
| Diode | D9, D10 | D DIO 1000 V 1 A FR107 DO-41 |
| Diode | D7, D8 | N/A |
| SMD Diode | D5, D6, D12~D15 | D DIO 75 V 150 mA LL4148 SMD SOD-80C |
| SMD Diode | ZD2 | D ZD 18 V 0.225 W J BZX84C18VLT1 SOT-23 |
| SMD Diode | ZD3 | D ZD 8.2 V ½ W BZX84C8V2LT1 SMD SOT-23 |
| Transistor | Q1, Q2 | E13005 TO-220 |
| Transistor | Q4 | STBV42 hFE = 24-29 Ts < 2.0 μS TO-92 |
| SMD Transistor | Q5 | MMBT4401LT1 600 mA 40 V SOT-23/β > 200 |
| SMD Transistor | M1 | NMOS 60 V 230 mA 2N7002 SOT-23 |
| Triac | TR1 | BTA06-600C 6 A 600 V TO-220 ST |
| Fuse Tube | F1 | 3 A/250 V |
| Inductor | L2, L4 | Fixed inductor LGA0410TB-330K |
| Inductor | L1 | Common Mode Inductor |
| Inductor | L3 | FEP150L3 EE19 |
| Transformer | T1 | Φ10*6*5 |
| IC | IC1 | IC MOC3023 DIP-6 |

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A ballast comprising:
a rectifier circuit;
a multiplier component;
a switch for coupling and decoupling the multiplier component from the rectifier circuit;
an input circuit wherein the switch is configured to operate in conjunction with a voltage change at the input circuit;
a load driver coupled for receiving current from the rectifier circuit; and
a control circuit coupled between the input circuit and the switch, the control circuit including a delay circuit and a diode connected at its anode to the delay circuit, the delay circuit driving the control circuit off during initial startup of the ballast for a predetermined period, after which the diode becomes reverse biased and the control circuit operates as a function of whether an actual measured input voltage is high or low as though the delay circuit was no longer present in the control circuit.

2. The ballast of claim 1 wherein the rectifier circuit is a full wave rectifier and wherein the switch is coupled to the rectifier circuit in such a way that when the multiplier component is coupled to the rectifier circuit, the rectifier circuit is converted to a voltage doubler circuit.

3. The ballast of claim 1 wherein the multiplier component is a voltage doubler circuit.

4. The ballast of claim 1 wherein the load driver is an inverter circuit configured to drive a fluorescent lamp.

5. The ballast of claim 1 wherein the control circuit is configured to open and close the switch.

6. The ballast of claim 5 wherein the control circuit is configured to open the switch when the input voltage increases past a predetermined level.

7. The ballast of claim 5 wherein the control circuit is configured to open the switch when the input voltage is higher than 180 volts.

8. The ballast of claim 1 wherein the control circuit includes a coupling circuit.

9. The ballast of claim 8 wherein the coupling circuit includes an optical isolator.

10. The ballast of claim 8 wherein the coupling circuit includes a TRIAC.

11. The ballast of claim 1 wherein the control circuit includes an inverter stage to which the diode of the control circuit is connected.

12. The ballast of claim 8 wherein the control circuit includes a rectifier.

13. The ballast of claim 8 wherein the control circuit includes a coupling capacitor as a coupler.

14. The ballast of claim 8 wherein the control circuit includes a magnetic coupler.

15. The ballast of claim 1 wherein the switch is a TRIAC.

16. The ballast of claim 15 wherein the TRIAC is a first TRIAC and the switch includes a second TRIAC coupled to the first TRIAC.

17. The ballast of claim 16 wherein the second TRIAC is configured to be turned on by an optical signal.

* * * * *